Oct. 22, 1968    R. MARSIGLIA    3,406,642
FOOD MOLDING DEVICE
Filed July 27, 1966    2 Sheets-Sheet 1

INVENTOR.
ROBERT MARSIGLIA
BY
Joseph F. Fallon
ATTORNEY

Oct. 22, 1968  R. MARSIGLIA  3,406,642
FOOD MOLDING DEVICE

Filed July 27, 1966  2 Sheets-Sheet 2

INVENTOR.
ROBERT MARSIGLIA

BY
Joseph F. Padlon
ATTORNEY

United States Patent Office 3,406,642
Patented Oct. 22, 1968

3,406,642
FOOD MOLDING DEVICE
Robert Marsiglia, R.F.D. 2, Hillsdale, N.Y. 12529
Filed July 27, 1966, Ser. No. 568,203
5 Claims. (Cl. 107—1)

ABSTRACT OF THE DISCLOSURE

A device for forming simultaneously under pressure, a plurality of food jackets or holders made of suitable material which is compacted to a dense consistency and then filled with edible material or left empty to be filled later.

---

The present invention relates to the production of food retaining jackets. More particularly, it relates to a food molding device for compacting different food ingredients together.

The molding of edible jackets for the purpose of filling them with assorted delicacies in the form of olives or anchovies, for example, to produce hors d'oeuvres, is known in the art. However, such jackets, made from cooked rice or similar such suitable material, were heretofore shaped and molded in a laborious fashion, most usually by hand.

Accordingly, it is an object of the present invention to provide a device whereby food retaining jackets may be compacted and molded rapidly and with manual ease.

Another object of the present invention is to provide a device whereby a plurality of food jackets may be produced simultaneously, and said jackets subsequently packed and filled.

Another object of the present invention is to provide a device, as set forth, for producing food retaining jackets of a predetermined shape and then permitting filling of said jackets.

Another object of the present invention is to provide a device capable of applying pressure during the process of molding and filling the jackets so that they are made firm and densely packed.

Yet another object of the present invention is to provide a device which may be foot-operated by the user in producing the jackets.

Still another object of the present invention is to provide a device which is adjustable to accommodate varying dimensions of molds used to form the jackets.

A further object of the present invention is to provide a device, as set forth from which the food retaining jackets may be readily withdrawn after they have been molded and shaped.

A still further object of the present invention is to provide a device, as set forth, which is reliable and easy in operation and requires low maintenance.

A still further object of the present invention is to provide a device, as set forth, which may be manufactured and constructed economically.

I achieve the preceding objects through a device comprising a mold for shaping food in the form of jackets, a base member for supporting the mold, means cooperating with the mold and shaping the exterior surface of the jackets, means for shaping the interior surface of the jackets and associated with the mold and the means for shaping the exterior surface of the jackets, retaining and aligning means for retaining in aligned and cooperating positions the mold, base member, means for shaping the exterior surface of the jackets and means for shaping the interior surface thereof, and a pressure applying mechanism associated with the retaining and aligning means and capable of providing pressure whereby the jackets are formed within the mold and then filled with a suitable edible ingredient.

A detailed description of a preferred embodiment of my invention as well as the novel features and advantages thereof appear in the following specification taken in conjunction with the accompanying drawing, in which.

Figure 1:
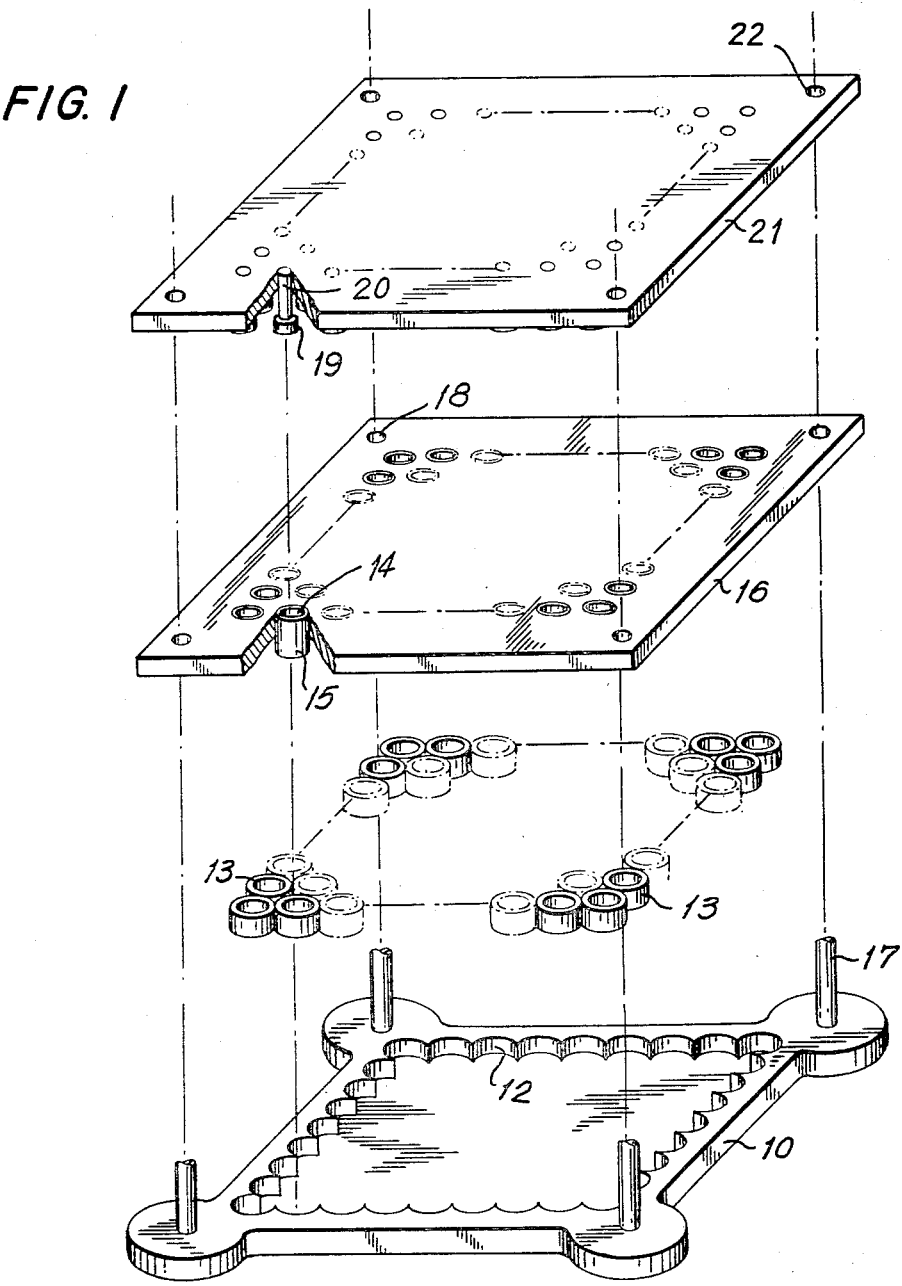
FIGURE 1 is an isometric composite view of the basic members which cooperate to mold the food jackets.

Referring to the drawing, a base plate 10 is mounted to a machine supporting platen 11. The base plate 10 includes a recess having side walls that are scallop-shaped. The scalloped edges 12 form retaining walls for a honeycomb mold 13. The periphery of the mold 13 is shaped to correspond to the scalloped edges 12, so that the mold may be inserted into the recess of the base plate.

Food as, for example, cooked rice, intended to form the jacket for the filling, is deposited within the cylindrical openings of the honeycomb. The honeycomb is open at both sides namely, at top and bottom, and when inserted into the recess of the base plate, the latter forms a floor for supporting the food deposited into the honeycomb. The honeycomb, on the other hand, is only partially filled with the food which is to constitute the outer jacket for holding the subsequent filling material.

Cylindrical tubes 15 are provided for insertion into the openings 13. It will be noted that the difference between the diameter of the tube outer surface, and the inner diameter of the opening 13 determines the thickness of the wall of the tubular food shell. Tubes 15 are mounted to a plate 16 in a concentric manner with respect to the corresponding holes or openings of the honeycomb mold.

The base plate 10 has secured to it a plurality of guide rods 17 located at each one of the four corners of the plate. The plate 16 contains a hole 18 at each one of its four corners corresponding to the guide rods. The diameter of the holes 18 is such, that the plate 16 is slidably movable along the guide rods. In this manner, the plate 16 may be accurately located with respect to the guide rods, and this assures that the tubes 15 enter their designated holes 14 concentrically. A separate cylindrical tube 15 is provided for each hole in the honeycomb. The tubes are secured to the plate 16 in an arrangement which assures that they all slide concentrically within the honeycomb holes simultaneously, when the plate 16 is moved downward along the guide rods 17.

Tubes 15 have an inside diameter which is substantially equal to the outside diameter of a plunger 19. The plunger 19 is attached to a rod 20 which is, in turn, secured to a plunger plate 21. At each one of the four corners of the plunger plate 21, is a hole 22 sufficiently large so that a guide rod 17 may slide freely within it. Similar to that described for the holes 18, the holes 22 are located in the plate 21 so that the entire plate is movable along the four guide rods 17.

Figure 2:
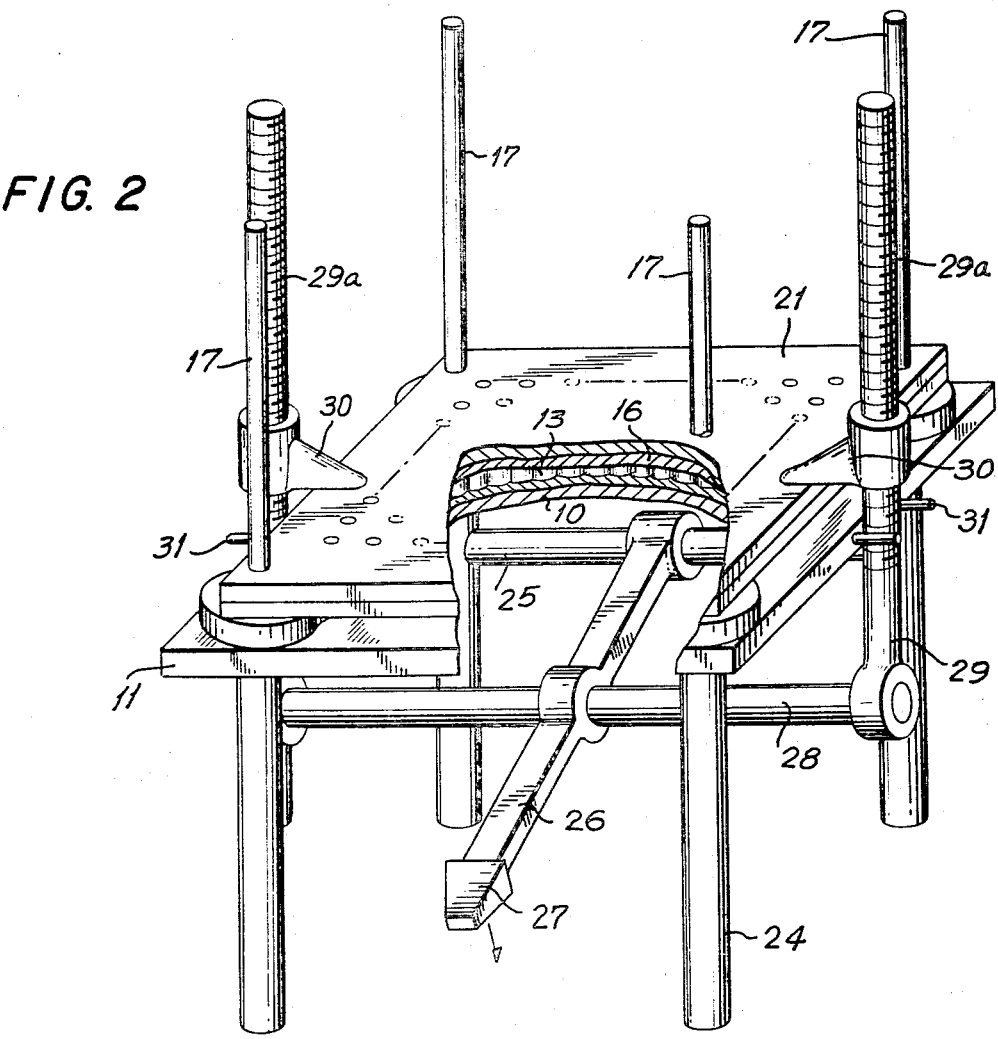
FIGURE 2 is an isometric view of the mechanism for receiving the structural members of FIGURE 1 and applying the necessary pressure for forming the food jackets.
Figure 3:
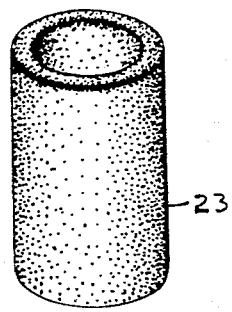
FIGURE 3 is an isometric view of the food jacket that may be typically produced with a food molding device of FIGURES 1 and 2.

Plunger rods 20 project downwardly from the underside of the plate 21 and are arranged so that a separate plunger 19 is provided for each tube 15. Plunger 19 is freely slidable within the tube 15, but is, at the same time, in close contact with the internal wall of the tube. The structural members shown in FIGURE 2 are assembled by inserting the honeycomb member 13 within the recess of base plate 10 provided for this purpose, and sliding the tube holding plate 16 down onto the honeycomb by way of the guide rods 17. The plunger plate 21 is then allowed to slide down upon the plate 16 in a similar manner. When thus assembled, the holes of the honeycomb, the inside and outside diameters of tubes 15, and the plungers 19 have all the same corresponding centers. Accordingly, the plate 16 may be brought down upon the honeycomb with the tubes 15 sliding within the holes of the honeycomb, and the plunger plate 21 may be brought down upon the plate 16 with the plunger 19 sliding within the tubes 15.

To produce the filled food products, cooked rice, for example, is distributed among the honeycomb holes so that they partially fill the holes. The plate 16 is then brought down upon the honeycomb causing the tubes 15 to imbed themselves within the rice. The plate 21 is finally forced down toward the plate 16, and this action by the plungers 19 forces the rice from within the tubes 15 to rise up along the outside of the tubes between the honeycomb holes and the outer surface of the tubes. The rice shell or jacket 23 for holding the filling is thus formed. The plungers 19 do not come into contact with the base plate 10, but fall short from the bottom in the recess by the thickness desired to form a bottom wall of the jacket. The high pressure used in the process causes the rice to be densely packed at the botom and side to produce a cup-shaped food product with firm walls for retaining the usual delicacies in the form of fillings.

After the jackets 23 have been thus formed, the plates 21 and 16 may be removed by sliding them upwards, and the honeycomb member may be tapped to loosen the jackets from the internal walls of the honeycomb holes. The honeycomb may then be drawn upward and out of the recess so that the jackets are left, standing upon the recess bottom of the base plate 10. As a final operation, the jackets may be filled while they are standing upright in this manner, or they may be gathered up and placed in a storage bin or on a conveyor for subsequent filling. The fiillings may consist of any of the usual delicacies as, for example, tuna fish, chopped liver, anchovies, etc.

In case the jackets are filled while in an upright manner as above described, the filler is inserted up to a certain height and then covered with more rice, whereupon plungers 19 can be brought down to compress the whole jacket as filled to form a unitary product.

In order to form the jackets at a rapid rate and apply the high pressure required to produce firm jacket walls for retaining the fillings, the forming members 10, 13, 16 and 21 may be used in conjunction with the mechanism illustrated in FIGURE 2. The mechanism consists of four supporting legs 24 upon which the platen 11 rests. The base plate 10 and the guide rods 17 secured thereto, are mounted upon the platen 11. No special aligning procedures are required to locate the base plate with respect to the platen 11. It is only necessary that the base plate be approximately centered with respect to the platen for proper operation. Attached to the rear legs 24, is a cross bar 25. The cross bar serves as pivot member for a foot treadle 26. The treadle is rotatable about the bar 25, and has, at its cantilevered end, a pedal 27 for manually actuating the treadle with a foot.

At a predetermined distance from the fulcrum or pivot bar 25, the treadle has a bore in which the cross member 28 is rotatable. The cross member 28 receives the journaled ends of two pressure rods 29 which have a threaded portion 29a for threadably receiving the shoes 30. Whenever the pedal 27 is forced downward, the cross member 28 also moves downward a proportionate amount. This downward motion of the cross member, draws along the pressure rods 29 and hence shoes 30.

When the mechanism of FIGURE 1 is to be applied for the production of the jackets 23, the shoes 30 are rotated so that they point away from the platen 11—diagonally opposite to the position shown in the drawing of FIGURE 2. The base plate 10 is then secured to the platen with the guide rods 17 extending vertically upward. The honeycomb member 13, the tube holding plate 16, and the plunger plate 21 are, in sequence, slidably moved down upon the base plate 10 by way of the guide rods 17. The shoes 30 are then rotated back to their initial position shown in the drawing, in which they extend over the area of the plate 21. If the foot-operated pedal 27 is now moved downward, the shoes 30 exert pressure upon the plunger plate 21, and this forces the plungers down into the cylindrical tubes so that the jackets become formed. After the pedal is released, the jacket forming members may be separated from one another and the jackets withdrawn before or after filling as described supra.

The pressure rods 29 are partially threaded over the length 29a, for the purpose of providing adjustment in the distance that the shoes extend above the base plate 10. Such adjustment allows considerable freedom for the range of motion of the jacket forming members, as well as to compensate for any type of backlash motion that may develop in the device. Furthermore, the screw threads 29a provide an especially desirable supporting and bearing surface for the pressure-applying shoes 30. Through the lever arrangement of the treadle, the force applied to the pedal 27 is magnified, and therefore the shoes which transmit the magnified force must be especially sturdy, together with their bearing and supporting surfaces. The threaded sections 29a provide bearing surfaces for the shoes with this requirement.

To retain the pressure rods 29 substantially upright at all times and permit, at the same time, their freedom of motion so that they may be actuated by the treadle 26, pins 31 are secured to the platen 11. These pins are located on each side of the pressure rods and function as limit stops which confine the sideways motion of the pressure rods and prevent them from rotating or falling toward the floor when the mechanism is not in use.

While I have described this invention in some detail, it will be understood by those skilled in the art that variations and modifications may be made without departing from the spirit thereof or the scope of the following claims.

I claim:

1. A food molding and filling device comprising, a base plate having a recess, a honeycomb-tube mold adapted to be fitted within the recess and have the openings in the honeycomb mold closed at their lower ends by a bottom of the recess, a tube-holding plate provided with a number of tubes, each of said tubes being of a diameter less than the internal diameter of each of the honeycomb openings in the mold so that when the tubes are fitted within the honeycomb openings annular spacing will be had between each of the tubes and the honeycomb opening in which said tube is fitted, and a plunger plate carrying a plurality of plungers for respective entry within the tubes to thereby force food material out of the tubes and into the annular spacing between the tubes and the walls of the heneycomb openings.

2. A food molding and filling device according to claim 1, wherein the openings in the honeycomb mold are open at the top and bottom, the plungers carried by the plunger plate being of such length that when said plungers enter into the tubes they will not reach the lower ends of the tubes so that a certain amount of the food product will not be displaced out of the tubes and will form bottom walls for the food material compacted in the annular spacings between the walls of the tubes and the walls of the honeycomb openings.

3. A food molding and filling device according to claim 1, wherein the base plate has a scalloped inner wall defining the recess, the honeycomb mold having a peripheral edge conforming in shape to said scalloped wall, the honeycomb mold having openings through it which are open at the top and bottom which openings become closed at their lower ends by the base of the recess when the honeycomb mold is fitted within said recess, the tubes carried by the tube-holding plate being also open at the top and bottom, and the plungers carried by the plunger plate being of less length than the depth of the tubes.

4. A food molding and filling device comprising, a base plate, a honeycomb mold for placement thereon, said mold having openings through it, a tube-holding plate for placement over the honeycomb mold, said plate carrying a number of tubes for respective entry into the openings in the honeycomb mold, each of the tubes having an outer diameter smaller than the inside diameter of the honeycomb mold openings, said tubes corresponding in number to the honeycomb openings and aligned therewith, a plunger plate containing a number of plungers each having a diameter slightly smaller than the inside diameter of the tubes whereby moldable material placed within the honeycomb openings and entering the tubes will be at least partly displaced from within the tubes and caused to be forced into the spacings between the tubes and honeycomb openings when the plungers are entered into the tubes, and guiding means between the base plate, the tube-carrying plate and the plunger plate.

5. A food molding and filling device accordings to claim 4, and including means for clamping the base plate, the tube-carrying plate and the plunger plate in superposed relation to bring the tubes into the honeycomb openings and the plungers within the tubes, said means having guide posts, a cross shaft extending between the posts, a foot-operated lever connected to the cross shaft and operative to lower the shaft and the posts carried thereby, shoes adjustable on the posts and operative on the descent of the same under pressure imposed on the foot lever to apply pressure on the superposed plates, the shoes being swingable on the posts and away from the plates to cause them to release the pressure on the plates.

References Cited

UNITED STATES PATENTS

| 1,467,351 | 9/1923 | Blunt | 107—1 |
| 1,674,033 | 6/1928 | Carpenter | 99—383 |
| 1,987,084 | 1/1935 | Snodgrass | 107—1 |
| 3,129,462 | 4/1964 | Borah | 18—16 |
| 3,195,479 | 7/1965 | Beck et al. | 107—15 |

WALTER A. SCHEEL, *Primary Examiner.*

A. O. HENDERSON, *Assistant Examiner.*